United States Patent
Pham

(10) Patent No.: US 11,222,099 B2
(45) Date of Patent: Jan. 11, 2022

(54) METHODS, SYSTEMS, AND MEDIA FOR AUTHENTICATING USERS USING BLOCKCHAINS

(71) Applicant: Thien Van Pham, Lacey, WA (US)

(72) Inventor: Thien Van Pham, Lacey, WA (US)

(73) Assignees: Synergex Group, Greenwich, CT (US); Pham Holdings, Inc., Lacey, WA (US); Wayne Taylor, Chandler, AZ (US)

( * ) Notice: Subject to any disclaimer, the term of this patent is extended or adjusted under 35 U.S.C. 154(b) by 278 days.

(21) Appl. No.: 16/271,024

(22) Filed: Feb. 8, 2019

(65) Prior Publication Data
US 2020/0257778 A1     Aug. 13, 2020

(51) Int. Cl.
| | | |
|---|---|---|
| G06F 21/31 | (2013.01) | |
| H04L 29/06 | (2006.01) | |
| G06F 21/45 | (2013.01) | |
| H04L 9/32  | (2006.01) | |

(52) U.S. Cl.
CPC .............. *G06F 21/31* (2013.01); *G06F 21/45* (2013.01); *H04L 63/0884* (2013.01); *H04L 9/3236* (2013.01); *H04L 2209/38* (2013.01)

(58) Field of Classification Search
CPC .......... G06F 21/31; G06F 21/45; G06F 21/64; H04L 63/0884; H04L 2209/38; H04L 9/3236; H04L 9/3239; H04L 63/10; H04L 63/08
See application file for complete search history.

(56) References Cited

U.S. PATENT DOCUMENTS

| | | | | |
|---|---|---|---|---|
| 9,992,022   | B1* | 6/2018  | Chapman        | G06F 21/604 |
| 10,409,783  | B1* | 9/2019  | Miller         | H04L 9/0637 |
| 10,581,847  | B1* | 3/2020  | Sun            | H04L 9/3239 |
| 10,628,454  | B2* | 4/2020  | Gauvreau, Jr.  | H04L 9/3239 |
| 10,735,193  | B1* | 8/2020  | Knas           | H04L 9/0861 |
| 10,805,085  | B1* | 10/2020 | Liang          | H04L 9/3239 |
| 10,887,301  | B1* | 1/2021  | Vera           | G06F 16/1834 |
| 2009/0249462 | A1* | 10/2009 | Chhabra       | G06Q 20/356 726/8 |
| 2010/0274910 | A1* | 10/2010 | Ghanaie-Sichanie | H04L 67/42 709/229 |
| 2011/0202989 | A1* | 8/2011  | Otranen       | H04L 63/10 726/8 |
| 2016/0321654 | A1* | 11/2016 | Lesavich      | G06Q 20/321 |

(Continued)

OTHER PUBLICATIONS

International Search Report and Written Opinion dated Apr. 30, 2020 in International Patent Application No. PCT/US2020/016377, pp. 1-8.

*Primary Examiner* — Aravind K Moorthy
(74) *Attorney, Agent, or Firm* — Byrne Poh LLP

(57) ABSTRACT

Methods, systems, and media for authenticating users using blockchains are provided. In some embodiments, the method comprises: receiving, at a user device of a user, user credentials for authentication to an application associated with the user device; determining whether the user credentials are valid for the application using a local blockchain stored on the user device; in response to determining that the user credentials are valid, generating a new block to be added to the local blockchain; adding the new block to the local blockchain; and granting access to the application based on the validated user credentials.

15 Claims, 3 Drawing Sheets

(56) References Cited

U.S. PATENT DOCUMENTS

| | | | |
|---|---|---|---|
| 2017/0046651 A1* | 2/2017 | Lin | G06Q 20/367 |
| 2017/0063865 A1* | 3/2017 | Belchee | H04L 63/102 |
| 2017/0244707 A1 | 8/2017 | Johnsrud et al. | |
| 2017/0244721 A1 | 8/2017 | Kurian et al. | |
| 2017/0279800 A1* | 9/2017 | Castinado | G06F 21/32 |
| 2017/0295157 A1* | 10/2017 | Chavez | H04B 1/3816 |
| 2017/0337362 A1* | 11/2017 | Arunachalam | G06F 21/32 |
| 2018/0068091 A1* | 3/2018 | Gaidar | G06F 21/16 |
| 2018/0137512 A1 | 5/2018 | Georgiadis et al. | |
| 2018/0145968 A1* | 5/2018 | Rykowski | H04L 63/0815 |
| 2018/0159843 A1* | 6/2018 | Sajja | H04L 9/0894 |
| 2018/0204213 A1* | 7/2018 | Zappier | H04L 63/10 |
| 2018/0270065 A1 | 9/2018 | Brown et al. | |
| 2018/0293576 A1* | 10/2018 | Song | H04L 9/3236 |
| 2018/0314817 A1* | 11/2018 | Gadde | G06F 21/604 |
| 2018/0375659 A1* | 12/2018 | Kozma | H04L 9/3231 |
| 2019/0004789 A1* | 1/2019 | Mills | G06F 8/36 |
| 2019/0013948 A1* | 1/2019 | Mercuri | H04L 9/0643 |
| 2019/0026450 A1* | 1/2019 | Egner | G06F 21/44 |
| 2019/0036957 A1* | 1/2019 | Smith | H04L 63/101 |
| 2019/0057454 A1* | 2/2019 | Komenda | H04L 9/3242 |
| 2019/0059203 A1* | 2/2019 | Staples | G06Q 50/02 |
| 2019/0080405 A1* | 3/2019 | Molinari | G06Q 20/06 |
| 2019/0089694 A1* | 3/2019 | Newton | G06F 21/6218 |
| 2019/0132131 A1* | 5/2019 | Clements | H04L 63/123 |
| 2019/0149550 A1* | 5/2019 | Brakeville | G06F 21/62 726/5 |
| 2019/0173854 A1* | 6/2019 | Beck | H04L 9/3239 |
| 2019/0229890 A1* | 7/2019 | Brehmer | H04L 9/3242 |
| 2019/0229920 A1* | 7/2019 | Naqvi | H04L 9/321 |
| 2019/0236559 A1* | 8/2019 | Padmanabhan | G06F 21/64 |
| 2019/0238316 A1* | 8/2019 | Padmanabhan | H04L 9/3297 |
| 2019/0251573 A1* | 8/2019 | Toyota | G06Q 10/1053 |
| 2019/0273616 A1* | 9/2019 | Bres | H04L 9/088 |
| 2019/0289017 A1* | 9/2019 | Agarwal | H04L 63/0838 |
| 2019/0319938 A1* | 10/2019 | Castinado | G06Q 20/3823 |
| 2019/0342290 A1* | 11/2019 | Mittal | H04L 63/083 |
| 2019/0361869 A1* | 11/2019 | Krabbenhoft | H04L 9/3239 |
| 2019/0370250 A1* | 12/2019 | Tipton | G06Q 20/401 |
| 2019/0370358 A1* | 12/2019 | Nation | G06F 16/1805 |
| 2019/0372834 A1* | 12/2019 | Patil | H04L 41/0806 |
| 2019/0372949 A1* | 12/2019 | Sanciangco | G06F 21/45 |
| 2019/0379543 A1* | 12/2019 | Sethi | H04L 9/3236 |
| 2020/0005410 A1* | 1/2020 | McKee | G06F 21/64 |
| 2020/0021590 A1* | 1/2020 | Jeuk | H04L 63/0892 |
| 2020/0034454 A1* | 1/2020 | Chamarajnager | H04W 4/35 |
| 2020/0034551 A1* | 1/2020 | Cantrell | G06F 21/32 |
| 2020/0036530 A1* | 1/2020 | Lampkins | G06F 21/645 |
| 2020/0050386 A1* | 2/2020 | Natarajan | G06F 3/067 |
| 2020/0053080 A1* | 2/2020 | Hamlin | H04L 63/083 |
| 2020/0058021 A1* | 2/2020 | Mittal | G06Q 20/385 |
| 2020/0066072 A1* | 2/2020 | Galvez | H04L 9/0637 |
| 2020/0073657 A1* | 3/2020 | Robison | G06F 9/44589 |
| 2020/0074056 A1* | 3/2020 | Hruska | H04L 9/3231 |
| 2020/0076198 A1* | 3/2020 | Beckmann | H02J 3/32 |
| 2020/0076827 A1* | 3/2020 | Gluck | H04L 9/3239 |
| 2020/0090168 A1* | 3/2020 | Mossier | G06F 21/35 |
| 2020/0097927 A1* | 3/2020 | Groarke | G06Q 20/02 |
| 2020/0097950 A1* | 3/2020 | Thompson | H04L 9/3239 |
| 2020/0134143 A1* | 4/2020 | Deole | G06Q 20/10 |
| 2020/0162266 A1* | 5/2020 | Miller | H04L 63/0861 |
| 2020/0167741 A1* | 5/2020 | Gamaroff | G06Q 20/065 |
| 2020/0177393 A1* | 6/2020 | Lopez | H04L 9/3236 |
| 2020/0186523 A1* | 6/2020 | Kursun | H04L 9/3239 |
| 2020/0193168 A1* | 6/2020 | Zhao | G06K 9/6201 |
| 2020/0220881 A1* | 7/2020 | Krishnamurthy | H04L 9/3239 |
| 2020/0226267 A1* | 7/2020 | Bengston | H04L 9/0637 |
| 2020/0228530 A1* | 7/2020 | Zlotnick | H04L 63/308 |
| 2020/0265351 A1* | 8/2020 | Rohit | G06Q 10/067 |
| 2020/0293663 A1* | 9/2020 | Mugundan | G06F 21/44 |
| 2020/0302431 A1* | 9/2020 | Polehn | H04L 9/0637 |
| 2020/0313854 A1* | 10/2020 | Verma | H04L 9/3239 |
| 2020/0336318 A1* | 10/2020 | Garg | H04L 9/3297 |
| 2020/0349142 A1* | 11/2020 | Padmanabhan | G06F 16/27 |
| 2020/0351095 A1* | 11/2020 | Yadav | G06F 16/2365 |
| 2020/0363994 A1* | 11/2020 | Jing | G06F 21/6209 |
| 2020/0371833 A1* | 11/2020 | Baset | G06F 9/466 |
| 2020/0389518 A1* | 12/2020 | Zhang | H04L 67/1048 |
| 2020/0396059 A1* | 12/2020 | Micali | H04L 9/085 |
| 2020/0396083 A1* | 12/2020 | Koduri | H04L 9/0637 |

\* cited by examiner

METHODS, SYSTEMS, AND MEDIA FOR AUTHENTICATING USERS USING BLOCKCHAINS

TECHNICAL FIELD

The disclosed subject matter relates to methods, systems, and media for authenticating users using blockchains.

BACKGROUND

People increasingly use multiple user devices and access multiple applications from each device. For example, a person may have multiple user devices (e.g., a mobile phone, a tablet computer, a desktop computer, etc.) and multiple Internet of Things (IoT) devices in their home or office that may each access different applications. Each user device may need to be authenticated to the application to access and use the application.

Using a distributed blockchain server to authenticate user devices can be time consuming and resource intensive. For example, to validate a user device on a distributed blockchain network, the user device must connect to a blockchain server of the blockchain network, which then updates a block of the blockchain to the rest of the blockchain servers of the blockchain network. Furthermore, using a distributed blockchain network can pose a security risk. For example, using blockchain servers that are controlled by consensus can allow a hacker to access a blockchain server of the blockchain network, which can leave the entire blockchain network vulnerable.

Accordingly, it is desirable to provide new methods, systems, and media for authenticating users using blockchains.

SUMMARY

Methods, systems, and media for authenticating users using blockchains are provided.

In accordance with some embodiments of the disclosed subject matter, a method for authenticating users using blockchains is provided, the method comprising: receiving, at a user device of a user, user credentials for authentication to an application associated with the user device; determining whether the user credentials are valid for the application using a local blockchain stored on the user device; in response to determining that the user credentials are valid, generating a new block to be added to the local blockchain; adding the new block to the local blockchain; and granting access to the application based on the validated user credentials.

In accordance with some embodiments of the disclosed subject matter, a system for authenticating users using blockchains is provided, the system comprising: a memory; and a hardware processor that, when executing computer executable instructions stored in the memory, is configured to: receive, at a user device of a user, user credentials for authentication to an application associated with the user device; determine whether the user credentials are valid for the application using a local blockchain stored on the user device; in response to determining that the user credentials are valid, generate a new block to be added to the local blockchain; add the new block to the local blockchain; and grant access to the application based on the validated user credentials.

In accordance with some embodiments of the disclosed subject matter, a non-transitory computer-readable medium containing computer executable instructions that, when executed by a processor, cause the processor to perform a method for authenticating users using blockchains is provided, the method comprising: receiving, at a user device of a user, user credentials for authentication to an application associated with the user device; determining whether the user credentials are valid for the application using a local blockchain stored on the user device; in response to determining that the user credentials are valid, generating a new block to be added to the local blockchain; adding the new block to the local blockchain; and granting access to the application based on the validated user credentials.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
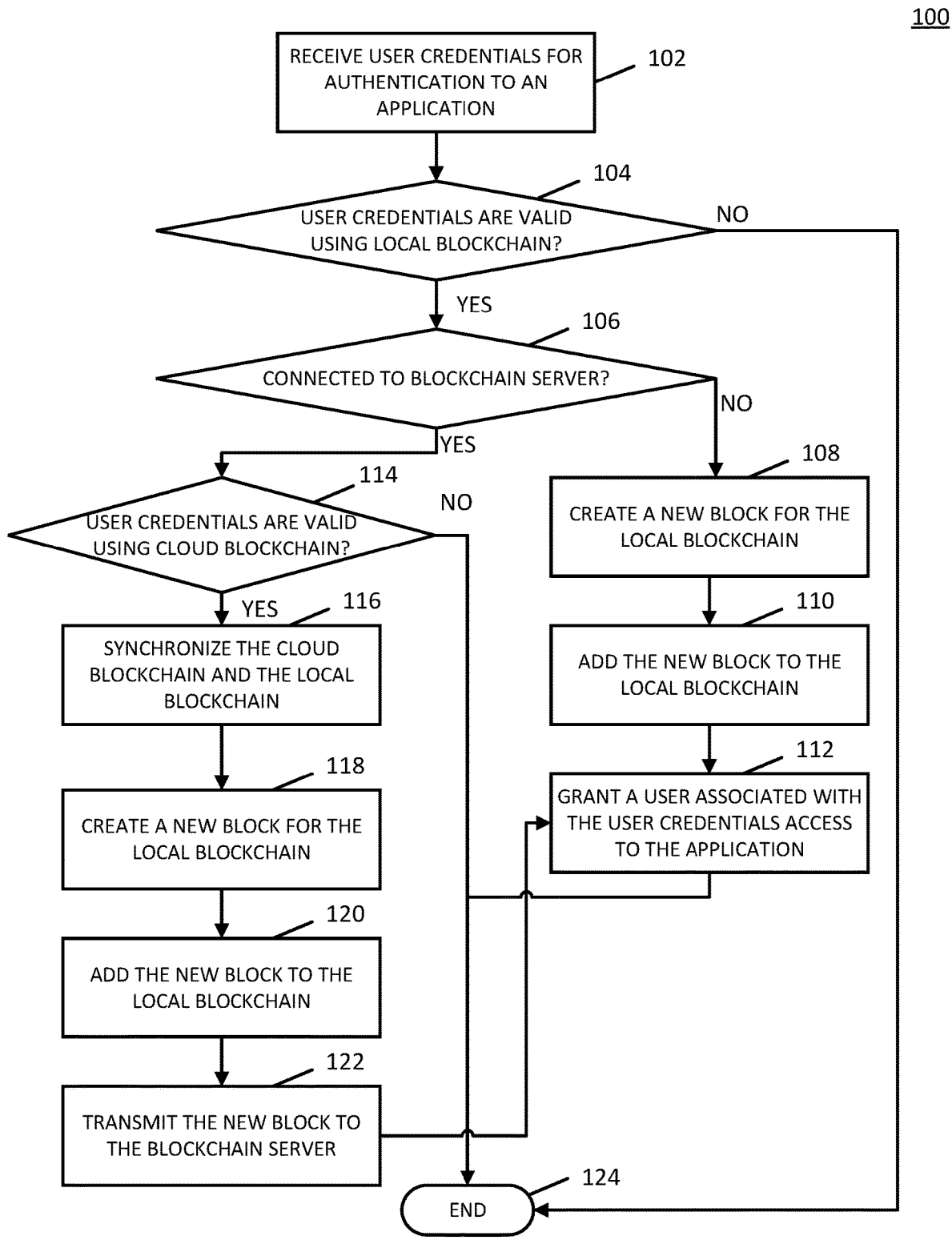
FIG. 1 shows an example of a process for authenticating users using blockchains in accordance with some embodiments of the disclosed subject matter.

In accordance with various embodiments, mechanisms (which can include methods, systems, and media) for authenticating users using blockchains are provided.

In some embodiments, the mechanisms described herein can be used to authenticate a user of a user device to an application to be opened or executed on the user device using a local blockchain stored on the user device and/or a cloud blockchain stored on a blockchain server. In some embodiments, the local blockchain and the cloud blockchain can be synchronized such that the local blockchain and the cloud blockchain are identical.

In some embodiments, a user device can by any suitable type of user device, such as a mobile phone, a tablet computer, a laptop computer, a desktop computer, a media playback device, an Internet of Things (IoT) device (e.g., a smart thermostat, a smart lock, a smart appliance, and/or any other suitable type of IoT device), and/or any other suitable type of user device. In some embodiments, the mechanisms can be used to grant access to any suitable type of application, such as an application for accessing messages (e.g., emails, text messages, and/or any other suitable type of messages) on the user device, an application for presenting media content on the user device, an application for controlling other devices using the user device, and/or any other suitable type of application.

In some embodiments, the mechanisms can authenticate a user of a user device using any suitable technique or combination of techniques. For example, in some embodiments, the mechanisms can receive user credentials associated with an application to which a user is to be authenticated and can validate the user credentials using a local blockchain stored on the user device. In some embodiments, in response to validating the user credentials using a local blockchain, the mechanisms can generate a new block to be added to the local blockchain. In some embodiments, the mechanisms can then attempt to connect to a blockchain server to cause a new block to be added to a cloud blockchain stored on a blockchain server. In some embodiments, in instances in which the mechanisms cannot connect to a blockchain server, the mechanisms can store a newly created block as an offline block which is to be added to a cloud blockchain at a next time a user device can successfully connect to the blockchain server. Conversely, in instances in which the mechanisms can connect to a blockchain server, the mechanisms can synchronize a local blockchain and a cloud blockchain such that the local blockchain and the cloud blockchain are identical, as described in more detail in connection with FIG. 1.

Note that, in some embodiments, a local blockchain can be distributed among multiple user devices. For example, in some embodiments, a local blockchain can be distributed among multiple user devices that are each associated with a particular user. As a more particular example, in some embodiments, a local blockchain can be distributed among multiple user devices and multiple IoT devices, such as multiple IoT devices that are each within a user's home, office, or other location.

Turning to FIG. 1, an example 100 of a process for authenticating users using blockchains is shown in accordance with some embodiments of the disclosed subject matter. In some embodiments, blocks of process 100 can be executed on a user device and/or on a blockchain server that stores a blockchain (e.g., cloud blockchain server 202, as shown in and described below in connection with FIG. 2).

Process 100 can begin at 102 by receiving user credentials for authentication to an application. In some embodiments, the application can be any suitable type of application that can be executed on a user device, such as an application for presenting media content, an application for accessing emails or other messages, an application corresponding to a social networking service, an application for controlling IoT devices in a user's home, and/or any other suitable type of application. In some embodiments, the user credentials can include any suitable type of user credentials, such as a username, a password, a biometric signature, a dynamic token, a unique device identifier corresponding to the user device, and/or any other suitable type of information that can uniquely identify a user of the user device and/or the user device.

Note that, in some embodiments, process 100 can receive the user credentials at any suitable time and/or in response to any suitable action. For example, in some embodiments, process 100 can receive the user credentials in response to an application being selected or opened on the user device. As a more particular example, in some embodiments, process 100 can present a user interface that requests user credentials (e.g., a username and/or a password, a biometric identifier, and/or any other suitable credential) in response to determining that the application has been selected or opened. As another example, in some embodiments, process 100 can request user credentials from a user in response to determining that the user device has been turned on or activated.

At 104, process 100 can determine whether the user credentials are valid using a local blockchain. Note that, in some embodiments, the local blockchain can be a blockchain that is locally stored in memory of the user device. In some embodiments, process 100 can determine whether the user credentials are valid using the local blockchain in any suitable manner. For example, in some embodiments, process 100 can authenticate the user credentials to the application using any suitable technique or combination of techniques. As a more particular example, in some embodiments, process 100 can verify a hash of the user credentials to authenticate the user credentials to the application.

Note that, in some embodiments, the local blockchain can be distributed among multiple user devices. For example, in some embodiments, a portion of the local blockchain can be stored on the user device that is being authenticated to the application, and a remainder of the local blockchain can be distributed among other user devices. As a more particular example, in some embodiments, the remainder of the local blockchain can be distributed among other user devices associated with the user of the user device that is being authenticated to the application, such as other user devices used by the user, IoT devices in a home or office of the user, and/or any other suitable user devices.

If, at 104, process 100 determines that the user credentials are not valid using the local blockchain ("no" at 104), process 100 can end at 124.

If, at 104, process 100 determines that the user credentials are valid using the local blockchain ("yes" at 104), process 100 can determine if there is a connection to a cloud blockchain server (e.g., cloud blockchain server 202 as shown in and described below in connection with FIG. 2) at 106. In some embodiments, process 100 can determine if there is a connection to the cloud blockchain server in any suitable manner. For example, in some embodiments, process 100 can attempt to connect to the cloud blockchain server using any suitable communication network and can determine if the attempt to connect to the cloud blockchain server was successful.

If, at 106, process 100 determines that there is no connection to the cloud blockchain server ("no" at 106), process 100 can create a new block for the local blockchain at 108. For example, in some embodiments, the new block can correspond to an instance in which the user device was authenticated to the application. In some embodiments, the new block can be generated using any suitable information, such as a username and/or a password corresponding to the application, a biometric signature, a dynamic token, a unique identifier corresponding to the user device, a Public Key Infrastructure (PKI) public and private key, an Internet Protocol (IP) address, a date and/or time (e.g., date and/or time the user credentials were authenticated using the local blockchain, and/or any other suitable date and/or time), a geographic location (e.g., current Global Positioning System, or GPS, coordinates of the user device, a current city or town of the user device, and/or any other suitable geographic location), and/or any other suitable information. Note that, in some embodiments, any suitable combination of information can be used to generate the new block. Additionally, note that, in some embodiments, the new block can be encrypted in any suitable manner using any suitable encryption protocol(s).

At 110, process 100 can add the new block to the local blockchain. Note that, in some embodiments, the new block can be added to the local blockchain as an offline block, which can be synchronized with a blockchain stored on the cloud blockchain server at a next time the user device connects to the cloud blockchain server.

At 112, process 100 can grant a user associated with the user credentials access to the application. In some embodiments, process 100 can grant access to the application on the user device in any suitable manner. For example, in some embodiments, process 100 can log in to a user account associated with the user and the application using the user credentials.

Process 100 can then end at 124.

Referring back to 106, if, at 106, process 100 determines that there is a connection to the blockchain server ("yes" at 106), process 100 can determine whether the user credentials are valid using a cloud blockchain at 114. In some embodiments, process 100 can determine whether the user credentials are valid using the cloud blockchain in any suitable manner. For example, in some embodiments, the user device can transmit a request to the blockchain server that requests validation of the user credentials to the application. In some embodiments, the blockchain server can validate the user credentials using any suitable technique or combination of techniques. For example, in some embodiments, process 100 can verify a hash associated with the user credentials.

If, at 114, process 100 determines that the user credentials are not valid ("no" at 114), process 100 can end at 124.

If, at 114, process 100 determines that the user credentials are valid ("yes" at 114), process 100 can synchronize the cloud blockchain and the local blockchain at 116. In some embodiments, process 100 can synchronize the cloud blockchain and the local blockchain using any suitable technique or combination of techniques. For example, in some embodiments, process 100 can transmit, from the user device to the blockchain server, all blocks created by process 100 that have not yet been added to the cloud blockchain. As a more particular example, in some embodiments, process 100 can transmit blocks that are indicated as offline blocks, as described above in connection with 110. As a specific example, in some embodiments, process 100 can transmit offline blocks that were previously added to the local blockchain at a time when there was no successful connection to the blockchain server. As another example, in some embodiments, process 100 can receive, at the user device from the blockchain server, any blocks that exist in the cloud blockchain stored on the blockchain server that are not yet included in the local blockchain. As a more particular example, in some embodiments, in instances where the local blockchain is distributed among multiple user devices, process 100 can receive, from the blockchain server, blocks that were added to the cloud blockchain from other user devices that store a portion of the local blockchain.

At 118, process 100 can create a new block for the local blockchain. As described above in connection with 108, process 100 can create the new block for the local blockchain in any suitable manner. For example, in some embodiments, the new block can be generated using any suitable information, such as a username and/or a password corresponding to the application, a biometric signature, a dynamic token, a unique identifier corresponding to the user device, a Public Key Infrastructure (PKI) public and private key, an Internet Protocol (IP) address, a date and/or time (e.g., a date and/or time the user device was authenticated to the application, and/or any other suitable date and/or time), a geographic location, and/or any other suitable information. Note that, in some embodiments, any suitable combination of information can be used to generate the new block. Additionally, note that, in some embodiments, the new block can be encrypted in any suitable manner and using any suitable protocol(s).

At 120, process 100 can add the new block to the local blockchain.

At 122, process 100 can transmit the new block to the blockchain server. In some such embodiments, the new block can be transmitted with instructions that cause the blockchain server to add the new block to the cloud blockchain stored on the blockchain server.

Process 100 can then grant the user associated with the user credentials access to the application at 112, as described above.

Figure 2:
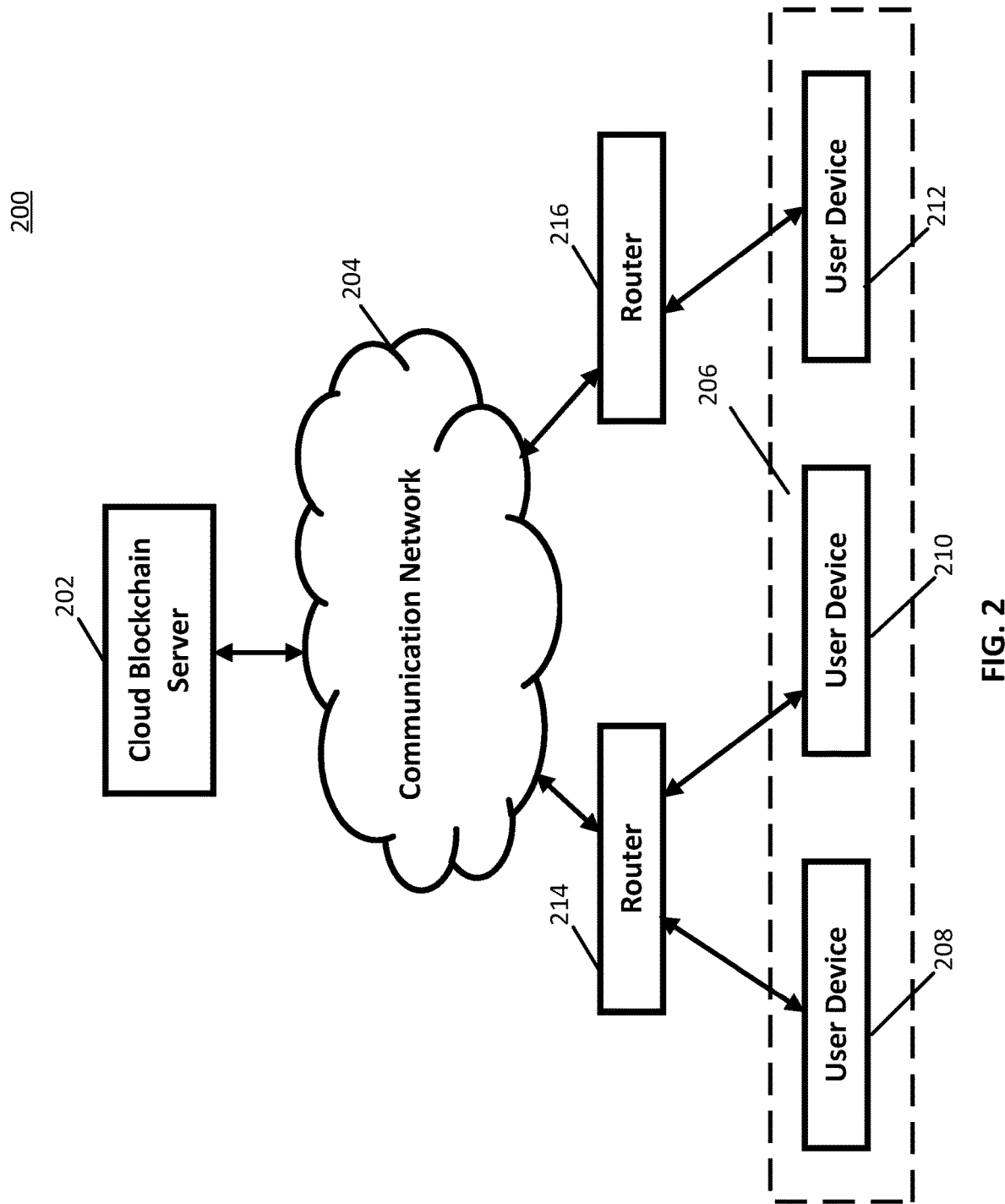
FIG. 2 shows a schematic diagram of an illustrative system suitable for implementation of mechanisms described herein for authenticating users using blockchains in accordance with some embodiments of the disclosed subject matter.

Turning to FIG. 2, an example 200 of hardware for authenticating users using blockchains that can be used in accordance with some embodiments of the disclosed subject matter is shown. As illustrated, hardware 200 can include a cloud blockchain server 202, a communication network 204, one or more user devices 206, such as user devices 208, 210, and 212, and/or one or more routers, such as router 214 and/or 216.

Cloud blockchain server 202 can be any suitable server(s) for storing information, data, programs, and/or any other suitable content. For example, in some embodiments, cloud blockchain server 202 can store information associated with a blockchain that can be used to authenticate a user to an application. In some embodiments, a cloud blockchain stored on cloud blockchain server 202 can be synchronized with a local blockchain stored on one or more of user devices 206, as shown in and described above in connection with FIG. 1.

Communication network 204 can be any suitable combination of one or more wired and/or wireless networks in some embodiments. For example, communication network 204 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 206 can be connected by one or more communications links to communication network 204 that can be linked via one or more communications links to cloud blockchain server 202. In some embodiments, user devices 206 can be connected to communication network 204 via one or more routers, such as router 214 and/or router 216. For example, in some embodiments, user devices 208 and 210 can be connected to communication network 204 via router 214, and user device 212 can be connected to communication network 204 via router 216. In some embodiments, the communications links can be any communications links suitable for communicating data among user devices 206 and server 202 such as network links, dial-up links, wireless links, hard-wired links, any other suitable communications links, or any suitable combination of such links.

User devices 206 can include any one or more user devices. For example, in some embodiments, user devices 206 can include user devices such as a mobile phone, a tablet computer, a laptop computer, a desktop computer, a wearable computer, and/or any other suitable type of computer. As another example, in some embodiments, user devices 206 can include media playback devices, such as a television, speakers, a game console, and/or any other suitable type of media playback device. As yet another example, in some embodiments, user devices 206 can include any suitable Internet of Things (IoT) devices, such as a smart thermostat, a smart lock, and/or any other suitable IoT devices. Note that, in some embodiments, a user of user devices 206 can be authenticated to any suitable application to be executed on user device 206, such as an application for accessing email, an application for presenting media content, and/or any other suitable type of application. In some embodiments, authentication can be performed using the techniques shown in and described above in connection with FIG. 1.

Although cloud blockchain server 202 is illustrated as one device, the functions performed by cloud blockchain server 202 can be performed using any suitable number of devices in some embodiments. For example, in some embodiments, multiple devices can be used to implement the functions performed by cloud blockchain server 202.

Although three user devices 208, 210, and 212 are shown in FIG. 2 to avoid over-complicating the figure, any suitable number of user devices, and/or any suitable types of user devices, can be used in some embodiments.

Figure 3:
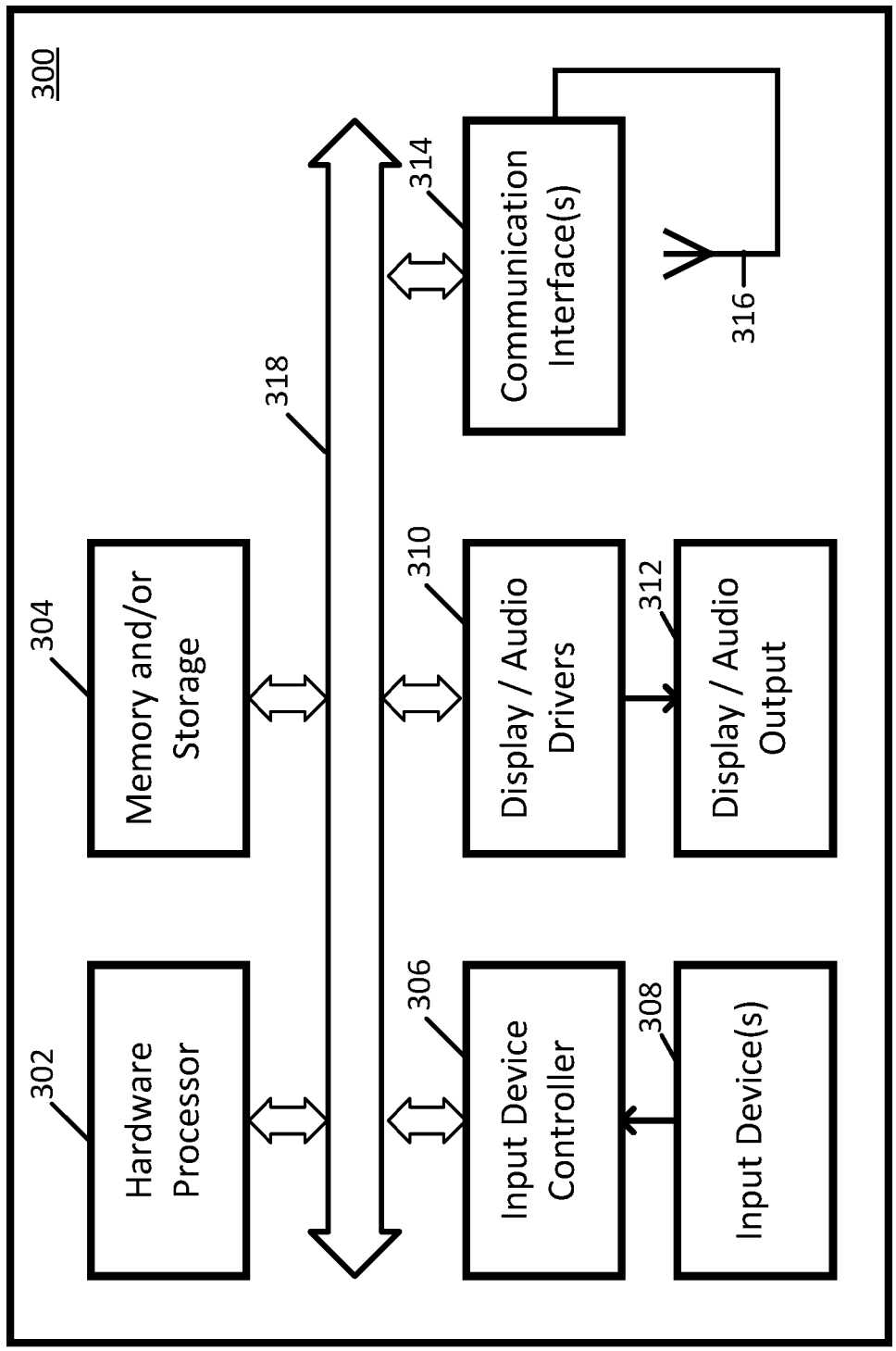
FIG. 3 shows a detailed example of hardware that can be used in a server and/or a user device of FIG. 2 in accordance with some embodiments of the disclosed subject matter.

Cloud blockchain server 202 and user devices 206 can be implemented using any suitable hardware in some embodiments. For example, in some embodiments, devices 202 and 206 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Hardware processor 302 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 302 can be controlled by a server program stored in memory and/or storage of a server, such as cloud blockchain server 202. For example, in some embodiments, the server program can cause hardware processor 302 to add a block to a cloud blockchain, synchronize a cloud blockchain with a blockchain locally stored on a user device, and/or perform any other suitable functions. In some embodiments, hardware processor 302 can be controlled by a computer program stored in memory and/or storage of a user device, such as user device 206. For example, in some embodiments, the computer program can cause hardware processor 302 to authenticate a user to an application to be executed on user device 306 using a local blockchain stored on user device 206, synchronize a locally stored blockchain with a blockchain stored on cloud blockchain server 202, grant access to a user of user device 206 to an application based on authentication of user credentials using a locally stored blockchain, and/or perform any other suitable functions.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from one or more input devices 308 in some embodiments. For example, input device controller 306 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 310 can be any suitable circuitry for controlling and driving output to one or more display/audio output devices 312 in some embodiments. For example, display/audio drivers 310 can be circuitry for driving a touchscreen, a flat-panel display, a cathode ray tube display, a projector, a speaker or speakers, and/or any other suitable display and/or presentation devices.

Communication interface(s) 314 can be any suitable circuitry for interfacing with one or more communication networks (e.g., computer network 204). For example, interface(s) 314 can include network interface card circuitry, wireless communication circuitry, and/or any other suitable type of communication network circuitry.

Antenna 316 can be any suitable one or more antennas for wirelessly communicating with a communication network (e.g., communication network 204) in some embodiments. In some embodiments, antenna 316 can be omitted.

Bus 318 can be any suitable mechanism for communicating between two or more components 302, 304, 306, 310, and 314 in some embodiments.

Any other suitable components can be included in hardware 200 in accordance with some embodiments.

In some embodiments, at least some of the above described blocks of the process of FIG. 1 can be executed or performed in any order or sequence not limited to the order and sequence shown in and described in connection with the figures. Also, some of the above blocks of FIG. 1 can be executed or performed substantially simultaneously where appropriate or in parallel to reduce latency and processing times. Additionally or alternatively, some of the above described blocks of the process of FIG. 1 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for authenticating users using blockchains are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for authenticating users using blockchains, comprising:

receiving, at a user device of a user, user credentials for authentication to an application associated with the user device, wherein the user credentials include a username and a password;

determining whether the user credentials are valid for the application using a local blockchain stored on the user device;

in response to determining that the user credentials are valid:
- generating a new block to be added to the local blockchain;
- adding the new block to the local blockchain; and
- granting access to the application based on the validated user credentials;

requesting a connection to a blockchain server that stores a cloud blockchain; and determining that the connection to the blockchain server was unsuccessful, wherein the new block is added to the local blockchain as an offline block in response to determining that the connection to the blockchain server was unsuccessful.

2. The method of claim 1, further comprising:
connecting to a blockchain server that stores a cloud blockchain; and
causing the new block to be added to the cloud blockchain.

3. The method of claim 2, further comprising determining whether the user credentials are valid for the application using the cloud blockchain, wherein causing the new block to be added to the cloud blockchain is in response to determining that the user credentials are valid for the application using the cloud blockchain.

4. The method of claim 2, further comprising:
receiving a plurality of blocks included in the cloud blockchain that are not included in the local blockchain; and
adding the plurality of blocks to the local blockchain.

5. The method of claim 1, wherein the local blockchain is a portion of a blockchain, and wherein other portions of the blockchain are stored locally by other user devices associated with the user.

6. A system for authenticating users using blockchains, the system comprising:
a memory; and
a hardware processor that, when executing computer executable instructions stored in the memory, is configured to:
receive, at a user device of a user, user credentials for authentication to an application associated with the user device, wherein the user credentials include a username and a password;
determine whether the user credentials are valid for the application using a local blockchain stored on the user device;
in response to determining that the user credentials are valid:
generate a new block to be added to the local blockchain;
add the new block to the local blockchain; and
grant access to the application based on the validated user credentials;
request a connection to a blockchain server that stores a cloud blockchain; and
determine that the connection to the blockchain server was unsuccessful, wherein the new block is added to the local blockchain as an offline block in response to determining that the connection to the blockchain server was unsuccessful.

7. The system of claim 6, wherein the hardware processor is further configured to:
connect to a blockchain server that stores a cloud blockchain; and
cause the new block to be added to the cloud blockchain.

8. The system of claim 7, wherein the hardware processor is further configured to determine whether the user credentials are valid for the application using the cloud blockchain, wherein causing the new block to be added to the cloud blockchain is in response to determining that the user credentials are valid for the application using the cloud blockchain.

9. The system of claim 7, wherein the hardware processor is further configured to:
receive a plurality of blocks included in the cloud blockchain that are not included in the local blockchain; and
add the plurality of blocks to the local blockchain.

10. The system of claim 6, wherein the local blockchain is a portion of a blockchain, and wherein other portions of the blockchain are stored locally by other user devices associated with the user.

11. A non-transitory computer-readable medium containing computer executable instructions that, when executed by a processor, cause the processor to perform a method for authenticating users using blockchains, the method comprising:
receiving, at a user device of a user, user credentials for authentication to an application associated with the user device, wherein the user credentials include a username and a password;
determining whether the user credentials are valid for the application using a local blockchain stored on the user device;
in response to determining that the user credentials are valid:
generating a new block to be added to the local blockchain;
adding the new block to the local blockchain; and
granting access to the application based on the validated user credentials;
requesting a connection to a blockchain server that stores a cloud blockchain; and
determining that the connection to the blockchain server was unsuccessful, wherein the new block is added to the local blockchain as an offline block in response to determining that the connection to the blockchain server was unsuccessful.

12. The non-transitory computer-readable medium of claim 11, wherein the method further comprises:
connecting to a blockchain server that stores a cloud blockchain; and
causing the new block to be added to the cloud blockchain.

13. The non-transitory computer-readable medium of claim 12, wherein the method further comprises determining whether the user credentials are valid for the application using the cloud blockchain, wherein causing the new block to be added to the cloud blockchain is in response to determining that the user credentials are valid for the application using the cloud blockchain.

14. The non-transitory computer-readable medium of claim 12, wherein the method further comprises:

receiving a plurality of blocks included in the cloud blockchain that are not included in the local blockchain; and adding the plurality of blocks to the local blockchain.

15. The non-transitory computer-readable medium of claim 11, wherein the local blockchain is a portion of a blockchain, and wherein other portions of the blockchain are stored locally by other user devices associated with the user.

* * * * *